Nov. 13, 1962  K. E. GEREN  3,064,235
AUDIBLE BROADBAND SONAR MONITOR
Filed Nov. 7, 1955  2 Sheets-Sheet 1

INVENTOR.
KEITH E. GEREN
BY George Sipkin
George Z. Pearson
ATTORNEYS

3,064,235
AUDIBLE BROADBAND SONAR MONITOR
Keith E. Geren, 4048 Manzanita Drive,
San Diego 5, Calif.
Filed Nov. 7, 1955, Ser. No. 545,581
10 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

This invention relates to receivers of underwater compressional wave energy and more particularly to listening equipment capable of detecting sonic energy within a broad band of frequencies.

In submarine warfare, sonar evidence of enemy activity may be manifested in many ways. Surface ship search sonars frequently employ ultrasonic frequencies and high source levels whereby enemy sonar signals may be detected before the relatively lower frequencies of ship noises are detected. Dipping sonars carried by helicopters, active sonobuoys, active harbor defense sonar, and active sonar-actuated mines could only be detected by ultrasonic equipment since no other acoustic signal of appreciable level is emitted. A submarine that is in transit is vulnerable to killer submarine attacks because its own self-noise makes its sonic equipment ineffective. The killer submarine could make a passive sonar approach requiring the use of but a single ping from its echo-ranging equipment at close range to provide data for an exact solution to the torpedo firing problem. If detection of this single ping of unknown frequency were possible, evasive action might be taken soon enough to destroy the value of the fire-control solution. The time available for evasive action and employment of countermeasures during an active acoustic-torpedo attack is relatively short. Therefore, speed and simplicity of gaining target information is of the utmost importance. It will be seen then that it is necessary to continuously monitor a wide band of sonar frequencies in order to provide early warning of enemy activity. This requires scanning all frequencies from 10 kc. to about 100 kc. in a manner capable of detecting pulses or pings as short as three milliseconds.

Heretofore, the only effective monitoring method available has been so called "sonaramic" receivers which successively scan narrow frequency bands within the broad band to be monitored. Such systems require an appreciable time to yield useful information, demand skilled operators and do not listen at all times to all frequencies within the broad acceptance band.

The present invention employs a receiver which is broadly equivalent to a filter of finite width but which has no particular centering frequency. Thus there is provided detection of any signal within the broad acceptance band without narrow band frequency scanning. The signal received by the hydrophone is fed through a broadband amplifier and then passed through two channels. A sum frequency produced by heterodyning with a fixed frequency in one channel is heterodyned with the signal delayed in the other channel to provide an output at said fixed frequency. The output is passed through a narrow filter, converted to audio frequency and fed to a loudspeaker. There is chosen a maximum relative delay in the two channels which is but a small fraction of the duration of the minimum pulse width to be received whereby correlation of the same pulse is always obtained. Correlation of the random broadband noise is prevented by the choice of a minimum delay. Thus the minimum detectable signal level may be below the broadband noise level. A manually tunable rejection filter calibrated in terms of input frequency is provided in one channel for frequency information.

The receiver of this invention makes possible the use of a secure system and method of underwater communication wherein intelligence is transmitted by pulse length and time coding of noise bursts that may appear at random anywhere within a wide frequency band. This is achieved by adjusting the relative delay in the two channels of the receiver to zero whereby the broad band noise is heterodyned to produce a single frequency output.

It is an object of this invention to continuously monitor a wide band of signal frequencies.

A further object of this invention is to improve the signal to noise ratio of a broadband receiver.

Still another object of this invention is the secure communication of intelligence impressed upon random noise carriers.

A further object of this invention is to permit simultaneous and continuous monitoring of underwater signals with good signal to noise ratio.

Another object of this invention is to improve the minimum detectible level of a sonar signal received together with broadband noise.

Other objects and many of the attendant advantages of this invention will be readily appreciated as the same becomes better understood by reference to the following detailed description when considered in connection with the accompanying drawings wherein.

Figure 1:
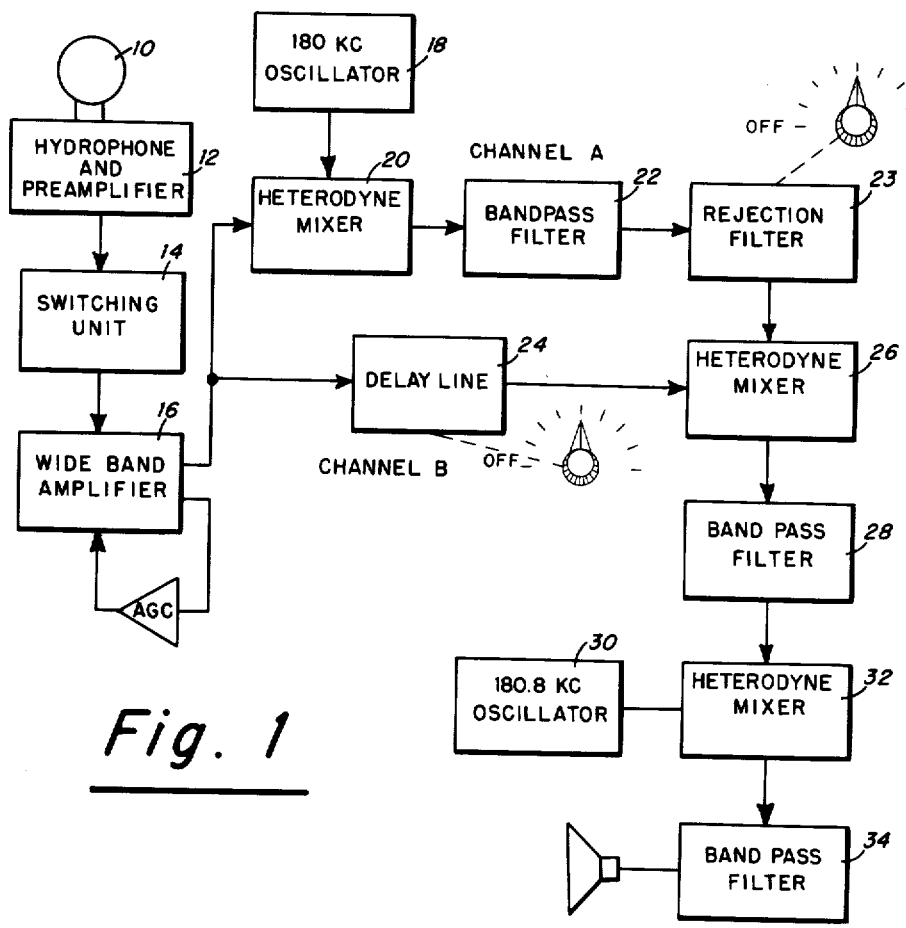
FIG. 1 is a block diagram of the receiving apparatus of this invention.

Referring to FIG. 1, there is shown diagrammatically a sonar receiving system including a hydrophone 10 which may be of the multi-element omnidirectional type in which similar electromechanical transducer elements are disposed in a circular array to cover all or a selected part of the underwater horizon. For example, the hydrophone may comprise 36 similar elements each of which covers substantially 10° of the surrounding area. Signals from the individual elements of the hydrophone are fed through preamplifiers 12 and through individual cables to a switching unit 14 which may be manually operated to yield the desired receiving patterns. The switch unit is operable to connect selective ones or selective combinations of transducer elements to amplifier 16. Normally the switch arrangement corresponding to the omnidirectional pattern is used until detection is made. The signal bearing of the signal is localized to an area within the beam width of a single element. This method locates the bearing of a low duty cycle pulsed signal quickly without the loss in sensitivity incurred with rapid scanning methods.

The signal output from the switching unit is fed to a wide band amplifier 16 where all signals (such as from 5 to 100 kc.) are amplified. Automatic gain control may be provided in this amplifier for the normal omnidirectional listening. After amplification the signal is presented to two channels, A and B. In channel A the input signal is translated upward a predetermined amount (such as 180 kc.) by the heterodyning oscillator 18, mixer 20 and band pass filter 22 so that any input frequency $f$ (kc.) becomes $180+f$. Channel B is provided with a delay line 24, whereby the signal is delayed in time an amount which may be on the order of 200 microseconds. The signal from each channel is presented to a mixer 26 which performs what may be termed the heterodyne correlation by providing a heterodyned frequency difference $(180+f-f=180)$. This 180 kc. signal, which is present only if the input persists for a period longer than the delay time of delay line 24, is passed through filter 28, converted to a suitable audio tone (such as 800 c.p.s.) by heterodyning oscillator 30, mixer 32, and bandpass filter 34 and is aurally presented to the operator through speaker 36. Thus, the output signal frequency is always the predetermined audio frequency irrespective of the frequency of the input signal, but the output signal amplitude depends on that of the original signal. If the delay in channels A and B were exactly equal all signals including interfering noise would produce an output signal. However, the additional delay line 24 in channel B tends to prevent the correlation of the broadband noise in the two channels and a new broadband noise is produced by the mixing of the now unrelated noise signals from the two channels. The delay required to prevent correlation of the noise background is inversely proportional to the bandwidth and is 10 microseconds for a 100 kc. band of white noise. A delay value on the order of 200 microseconds is chosen to ensure proper operation under actual noise conditions which differ considerably from the ideal white noise. Additional reduction of noise is effected by bandpass filter 28 which follows mixer 26 and is as narrow as the broadest anticipated signal will allow.

To provide frequency information a variable rejection filter 23 is provided in channel A. This variable filter will shunt out signals in narrow frequency bands selected by a manual control which is calibrated in terms of input frequencies. To determine the frequency of a received signal the variable rejection filter control is manipulated to scan the entire band in steps until the signal becomes faint or vanishes. After adjusting for the best null, the pointer of the frequency indicator control indicates the incoming signal frequency.

Since this system must produce an output signal for a single received pulse, the delay time must be substantially less than the duration of the shortest pulse expected (about one millisecond). The 200 microsecond delay will reduce the output duration of a one millisecond input pulse by twenty percent, which does not constitute a serious loss.

The system tends to convert a wide band of noise input to a single frequency but this tendency is avoided by the relative delay in the two channels. Narrow band information with good signal to noise ratio can be obtained from any frequency in a wide band and without scanning or prior knowledge of the frequency that may carry desired information.

When the relative delay in the two channels is adjusted to zero, a wide band noise input will produce an output signal at the frequency of oscillator 18. This signal contains random amplitude modulation but the wider the input noise band the more nearly the output signal approaches a pure sine wave. The amplitude of this signal is a function of input amplitude. It is, therefore, possible to transmit intelligence on a random noise band by amplitude modulation. The output of mixer 26 would be treated as a carrier and demodulated to obtain the information originally impressed upon random noise. Such a system could be advantageously used for communication where ambient noise conditions are a limiting factor, or for security.

Figure 2:
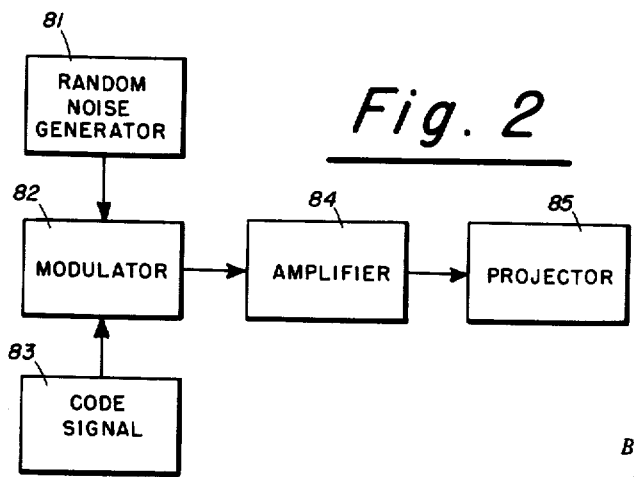
FIG. 2 is a block diagram of transmitting apparatus used in a secure communication system.

In identification systems where it is important that the enemy be unaware that identification is being sought, the receiving apparatus disclosed herein makes possible the use of noise bursts that may appear anywhere within a very wide frequency band to obtain identification by the coding of pulse length and pulse timing. Apparatus for transmitting such a signal is diagrammatically depicted in FIG. 2 and includes a random noise generator 81 which will generate bands of random noise which are centered on frequencies which may vary at random within the board acceptance band of the receiving apparatus. This random noise is caused to appear at the output of the modulator 82 as pulses of varying duration and time interval in accordance with the code signal 83 which is caused to modulate the duration and repetition rate of the noise. The modulated noise bursts, amplified in amplifier 84 and fed to the projector 85 transducer, are propagated through the water and received by the receiving apparatus of FIG. 1. Since the same receiver is used for both monitoring and identification the delay 24 is made adjustable from a maximum of about 200 microseconds (for broadband monitoring) to a minimum value equal to the delay inherent in heterodyning channel A (for coded communication). When the delay 24 is adjusted to its minimum value (for receiving secure communications) the relative delay in the two channels is zero and the wide band noise input appears at the output of mixer 26 as a signal having the frequency of oscillator 18 and bearing the pulse length or time coding impressed upon the noise carrier.

Figure 3:
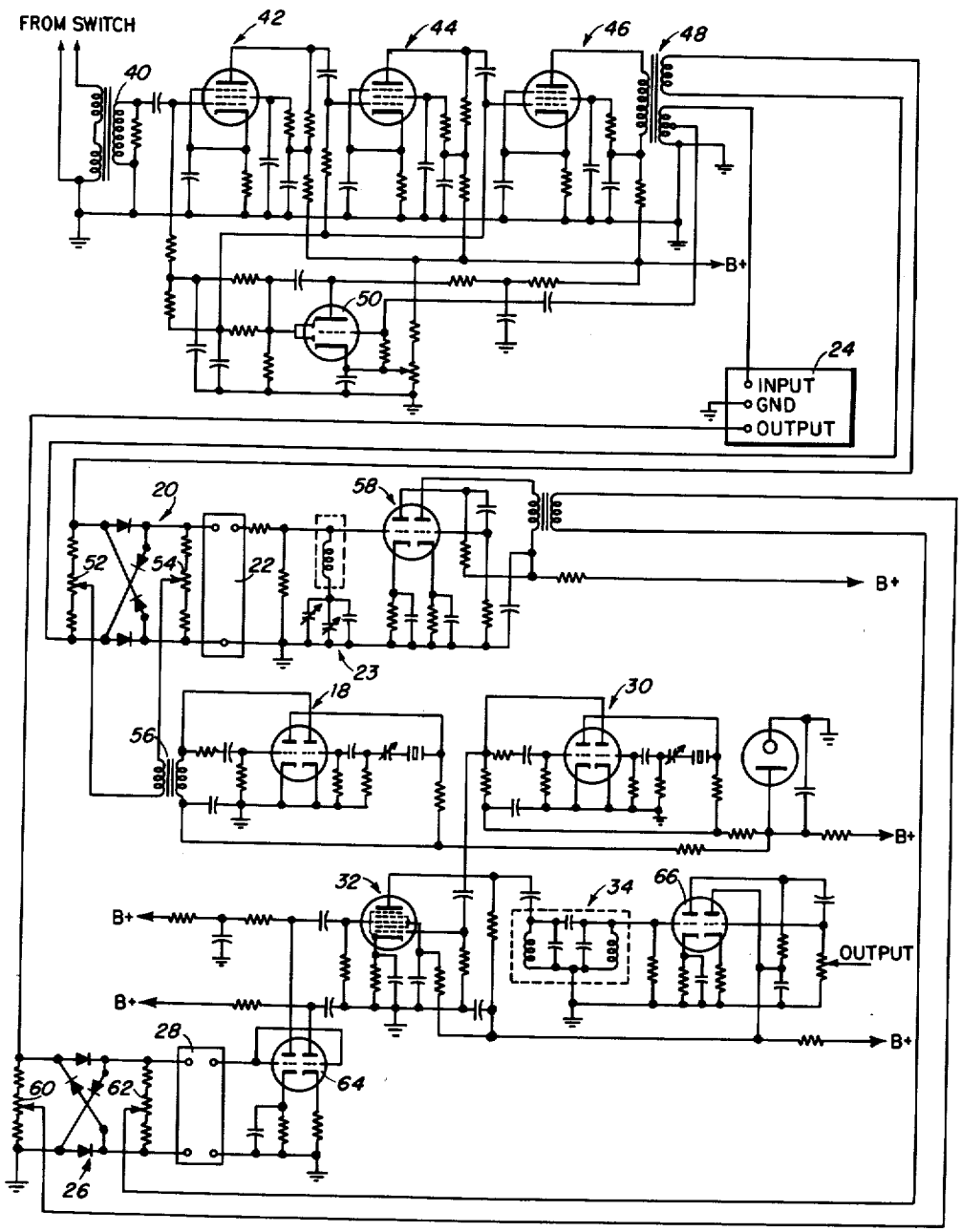
FIG. 3 is a circuit diagram of a portion of the apparatus of FIG. 1.

Portions of the receiving apparatus are embodied in the circuitry of FIG. 3 where amplifier 16 is shown as a three stage amplifier comprising an input transformer 40, two resistance-coupled stages 42, 44 and a transformer-coupled output stage 46. Output transformer 48 has two secondary windings allowing for two balanced outputs. One winding feeds a balanced modulator or mixer 20. The other winding feeds the electrical delay line 24 which comprises a plurality of series connected groups of reactive components. The amount of delay introduced by the delay line may be manually varied by selectively shunting out one or more groups of the reactive components. The center tap of one secondary winding feeds tube 50, a double diode-triode serving as the automatic gain control amplifier and rectifier. The output of tube 50 is filtered and applied to the control grids of stages 42, 44, 46. The output of the delay line is fed to mixer or balanced modulator 26.

Balanced modulator 20, which receives the signal from transformer 48, comprises a crystal diode assembly and is balanced by potentiometers 52, 54. The output of 180 kc. crystal controlled oscillator 18 is coupled through transformer 56 to modulator 20. Since the balanced modulator is a device which suppresses the carrier frequency, only the sum and difference of the incoming signal frequency and the oscillator frequency appear at the output of the modulator. A band pass filter 22 placed here rejects the difference frequencies and only the sum frequencies are retained.

The variable rejection filter 23 comprises a coil and variable capacitance in shunt across the line and is used to null out a given frequency by tuning the shunt arm to resonance. The variable capacitor dial is calibrated in terms of input frequency and frequency of an incoming signal is indicated by capacitor dial position when the audio output of the equipment drops.

A two stage amplifier 58 is used to make up losses in the balanced modulator. It comprises a dual triode having one half connected as a resistance coupled amplifier and the other half connected as a transformer-coupled amplifier, the output being fed to balanced modulator 26.

Balanced modulator 26 comprises a crystal diode assembly and is balanced by means of potentiometers 60, 62.

The output of the delay line and the sum frequencies from amplifier 58 are mixed in the modulator. It is here that the two signals displaced in frequency and time, but identical in pulse length and amplitude, are correlated or multiplied and furnish an output. When there is provided a relative delay in the two channels the noise bursts, being of random nature, are not completely correlated, and make up a very small portion of the output of modulator 26. With a zero relative delay, however, the random noise input is correlated and the output comprises a single frequency having the modulation characteristics of the noise input. This output is passed through filter 28 where all except the difference frequency of 180 kc. is rejected. The signal is then amplified by one half of tube 64 and applied to mixer 32, a pentagrid converter. The other half of tube 64 may be connected as a cathode follower to supply a 180 kc. output for test or other purposes or for a remote indicator.

In converter 32 the 180 kc. signal from tube 64 and the signal from the 180.8 kc. crystal controlled oscillator 30 are mixed. The output is passed through filter 34 which has a band width of 400 cycles and is centered on 800 cycles. This signal is supplied to one half of tube 66 where it is amplified and then fed through a power amplifier (not shown) to a speaker. The output of one half of tube 66 is also coupled to the second half thereof which may be connected as a cathode follower furnishing an 800 cycle signal for test purposes or for use with a remote indicator.

The noise spectrum at the output of mixer 26 has a triangular amplitude v. frequency distribution. This distribution triangle has its apex (maximum noise amplitude) located at the fixed frequency output of mixer 26 (180 kc.) and two sides of the triangle extend downwardly from the apex an amount equal to the input band width (of amplifier 16). Thus the base of the noise distribution triangle, in the disclosed apparatus, would extend from 85 kc. (=180—95) to 275 kc. (=180+95), each a point of zero noise amplitude. If the fixed frequency output of mixer 26 is less than the input band width, then the lower frequencies of the noise band passed by filter 28 will fold back and modify the noise distribution, enhancing at least a portion of the noise band. If this condition is not to detract from the performance of the equipment, the folding back of low frequency noise components must be limited to a frequency band below the lower limit of the band passed by filter 28. Therefore, the frequency of the output of mixer 26 (determined by oscillator 18) must be at least numerically equal to or greater than the sum of one half the input bandwidth (of amplifier 16) plus one half the bandwidth of filter 28. For this reason the second oscillator 30, which produces an audio heterodyned frequency substantially less than one half of the input bandwidth, must be introduced after the correlation is completed in mixer 26. It has been found that with the arrangement shown the noise level passed by filter 28 is as much as 3 db below the noise level passed by the filter when the fixed frequency output of mixer 26 was about 800 cycles. The latter output is of course obtained by placing both oscillators in channel A and before mixer 26.

Obviously many modifications and variations of the present invention are possible in the light of the above teachings. It is therefore to be understood that within the scope of the appended claims the invention may be practiced otherwise than as specifically described.

What is claimed is:

1. A system for receiving a signal of a short duration within a predetermined frequency band comprising in combination, a hydrophone, means for amplifying all signals within said band received by said hydrophone, a heterodyne mixer, means for feeding the output of said amplifying means to said heterodyne mixer through two channels, means for shifting the frequency of the signal in one of said channels by a fixed amount, means for producing a relative delay of the signal in the other of said channels substantially less than said short duration.

2. The structure of claim 1 wherein said one of said channels includes a narrow band variable frequency rejection filter.

3. In a broadband sonar monitor for receiving pulses of noise or pulses of unknown carrier frequency within a predetermined broad frequency band, a wide band amplifier, a balanced modulator, a pair of channels for feeding the output of said amplifier to said modulator, one of said channels including a fixed frequency oscillator, a second modulator and a filter for providing a heterodyned sum frequency in said one channel, said channel having an inherent delay, the other of said channels including means for providing a delay selectively variable from an amount equal to the inherent delay of said first channel to an amount greater than said first amount but substantially less than the duration of received pulses.

4. The apparatus of claim 3 wherein said one channel includes means for selectively shunting narrow frequency bands to provide an indication of the frequency of received signals.

5. A broadband sonar monitor for receiving signals of unknown frequency within a selected broad frequency band comprising two signal channels, a fixed frequency oscillator, one of said channels including a heterodyne mixer for combining the received signals with oscillations of said fixed frequency oscillator, a second heterodyne mixer for combining the output of said two channels, variable time delay means in the other of said channels for providing a relative delay in said two channels.

6. The apparatus of claim 5 including a filter for selecting the fixed frequency from the output of said second modulator, said means for providing a relative delay including means for reducing the relative delay to zero whereby said filter will produce an output at said fixed frequency in response to received broadband noise.

7. Apparatus for receiving coded random bands of random noise within a selected frequency band comprising a hydrophone, a wide band amplifier coupled with said hydrophone for continuously amplifying all frequencies within said selected band, a fixed frequency oscillator, mixing means coupled with said amplifier and with said oscillator to provide a heterodyned sum signal, a balanced modulator, means for feeding said sum signal to said modulator as a first input thereof, means for feeding the output of said amplifier to said modulator as a second input thereof, said last mentioned means including means for reducing the relative delay of said first and second inputs to zero, and means in the output of said modulator for selecting an output signal of said fixed frequency.

8. A broadband monitor for receiving signals of unknown frequency within a selected broad input band comprising two signal channels, means for shifting the frequency of the signal in one of said channels by a fixed amount, means for providing a relative delay in said channels, a modulator for combining the outputs of said two channels to produce sum and difference frequencies, and means in the output of said modulator for selecting a fixed frequency which is numerically greater than one half the width of said input band.

9. The apparatus of claim 8 wherein said last mentioned means comprises a filter of finite width and said selected fixed frequency is at least numerically equal to the sum of one half said input band width and one half said finite width.

10. Apparatus for coded underwater communication comprising in combination means for generating random bands of random noise within a selected frequency band, means for modulating said noise bands with intelligence signals, means for propagating said modulated noise bands through the water, and broadband receiving means for demodulating the received modulated noise signal having a broadband amplifier, a balanced modulator, a pair of channels for feeding the output of said amplifier to said modulator, one of said channels having means for shifting the frequency of signals therein by a predetermined amount, said one channel having an inherent delay, the other of said channels including means for providing a delay therein equal to the inherent delay of said one channel, and means in the output of said modulator for selecting a fixed frequency.

References Cited in the file of this patent

UNITED STATES PATENTS

| | | |
|---|---|---|
| 2,175,270 | Koch | Oct. 10, 1939 |
| 2,580,148 | Wirkler | Dec. 25, 1951 |
| 2,624,836 | Dicke | Jan. 6, 1953 |
| 2,688,124 | Doty et al. | Aug. 31, 1954 |
| 2,699,494 | Albricht | Jan. 11, 1955 |
| 2,718,638 | De Rosa et al. | Sept. 20, 1955 |